(12) United States Patent
Yamada (10) Patent No.: US 12,545,232 B2
(45) Date of Patent: Feb. 10, 2026

(54) VEHICLE DRIVING APPARATUS

(71) Applicant: SUBARU CORPORATION, Tokyo (JP)

(72) Inventor: Shohei Yamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 126 days.

(21) Appl. No.: 18/530,517

(22) Filed: Dec. 6, 2023

(65) Prior Publication Data

US 2024/0199000 A1 Jun. 20, 2024

(30) Foreign Application Priority Data

Dec. 19, 2022 (JP) ................................. 2022-202223

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01)

(58) Field of Classification Search
CPC ....... B60W 20/15; B60W 10/06; B60W 10/08
See application file for complete search history.

(56) References Cited

U.S. PATENT DOCUMENTS

| 6,555,941 B1* | 4/2003 | Zepp | H02K 21/024 |
| | | | 310/90 |
| 12,319,133 B2* | 6/2025 | Hall | B60K 1/02 |
| 2019/0308630 A1* | 10/2019 | K | B60W 10/06 |
| 2024/0146166 A1* | 5/2024 | Druant | H02K 21/024 |

FOREIGN PATENT DOCUMENTS

| JP | S61266870 A | * 11/1986 |
| JP | 2005-61487 A | 3/2005 |
| JP | 2019-84892 A | 6/2019 |
| JP | 2020-100262 A | 7/2020 |

* cited by examiner

*Primary Examiner* — Hitesh Patel
*Assistant Examiner* — Reece Anthony Wakely
(74) *Attorney, Agent, or Firm* — TROUTMAN PEPPER LOCKE LLP (57) ABSTRACT

A vehicle driving apparatus includes: an electric motor including a rotor provided movably in an axial direction relative to a rotor shaft and a stator disposed on an outside of the rotor in a radial direction; a first gear provided movably in the axial direction relative to the rotor shaft and disposed so as to face an end face of the rotor; a power transmission path including a second gear engaged with the first gear and coupling the first gear and wheels to each other; and an actuator that moves the rotor to a first position and a second position. The rotor is moved to the second position by the actuator. The first gear is urged in the axial direction due to a magnetic force applied between the rotor and the first gear. A tooth surface of the first gear is pushed against a tooth surface of the second gear.

7 Claims, 12 Drawing Sheets

VEHICLE DRIVING APPARATUS

CROSS-REFERENCE TO RELATED APPLICATION

The present application claims priority from Japanese Patent Application No. 2022-202223 filed on Dec. 19, 2022, the entire contents of which are hereby incorporated by reference.

BACKGROUND

The disclosure relates to a vehicle driving apparatus provided in a vehicle.

An electric motor for driving wheels is mounted in a vehicle such as an electric automobile or a hybrid vehicle (see Japanese Unexamined Patent Application Publication Nos. 2005-61487, 2019-84892, and 2020-100262). In addition, for example, various gear trains and rotating shafts are incorporated in a power transmission path via which the electric motor and the wheels are coupled to each other.

SUMMARY

An aspect of the disclosure provides a vehicle driving apparatus to be provided in a vehicle. The vehicle driving apparatus includes an electric motor, a first gear, a power transmission path, and an actuator. The electric motor includes a rotor and a stator. The rotor is provided movably in an axial direction relative to a rotor shaft. The stator is disposed on an outside of the rotor in a radial direction. The first gear is provided movably in the axial direction relative to the rotor shaft. The first gear is disposed so as to face an end face of the rotor. The power transmission path includes a second gear engaged with the first gear. The power transmission path couples the first gear and wheels of the vehicle to each other. The actuator is configured to move the rotor to a first position where the rotor is disposed on an inside of the stator in the radial direction and a second position where the rotor is closer to the first gear than the first position. The rotor is moved to the second position by the actuator. The first gear is urged in the axial direction due to a magnetic force applied between the rotor and the first gear. A tooth surface of the first gear is pushed against a tooth surface of the second gear.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A backlash that is the gap between tooth surfaces is set to a gear train incorporated in a power transmission path. Accordingly, when a torque applied to the power transmission path is changed, the tooth surfaces of the gear train may come into contact with each other, thus generating a gear rattle. Such a gear rattle of the gear train is a factor in giving an uncomfortable feeling to an occupant. Thus, it is desirable to reduce such a gear rattle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
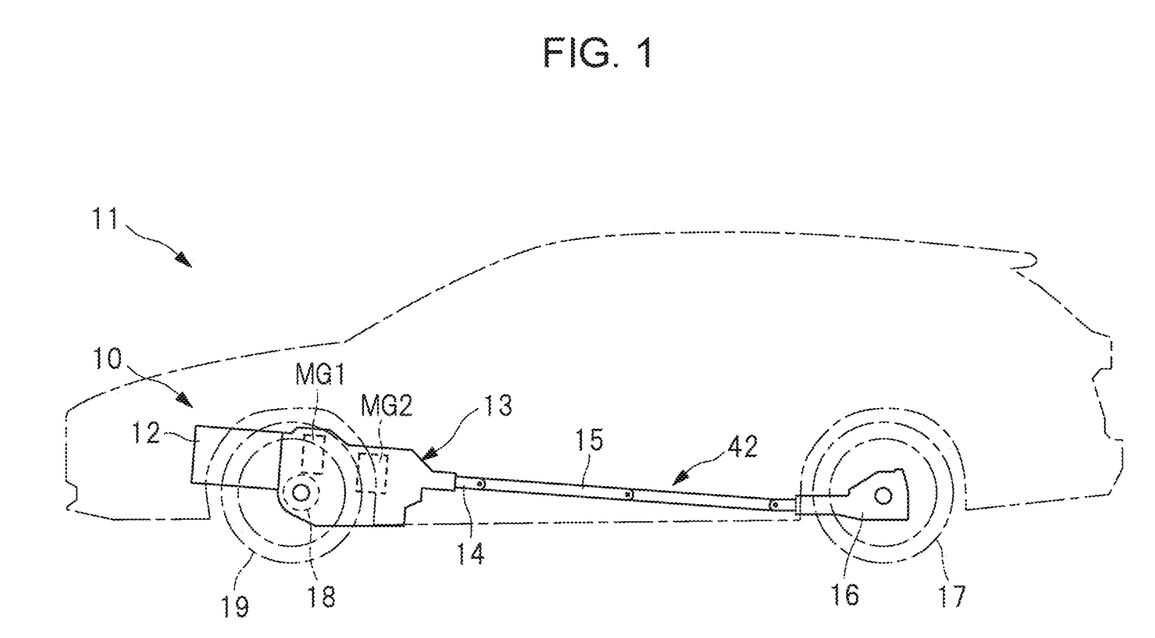
FIG. 1 is a diagram illustrating a vehicle in which a vehicle driving apparatus that is an embodiment of the disclosure is provided.

FIG. 1 is a diagram illustrating a vehicle 11 in which a vehicle driving apparatus 10, which is an embodiment of the disclosure, is provided. As illustrated in FIG. 1, a power unit 13 including an engine 12 and motor generators MG1 and MG2 is mounted in the vehicle 11. Rear wheels 17 are coupled to a rear-wheel output shaft 14 of the power unit 13 via a propeller shaft 15 and a rear differential mechanism 16. In addition, a front differential mechanism 18 is incorporated in the power unit 13, and front wheels 19 are coupled to the front differential mechanism 18. The power unit 13 illustrated in the figure is an all-wheel drive power unit, but is not limited thereto, and may be a front-wheel drive power unit or a rear-wheel drive power unit.

Figure 2:
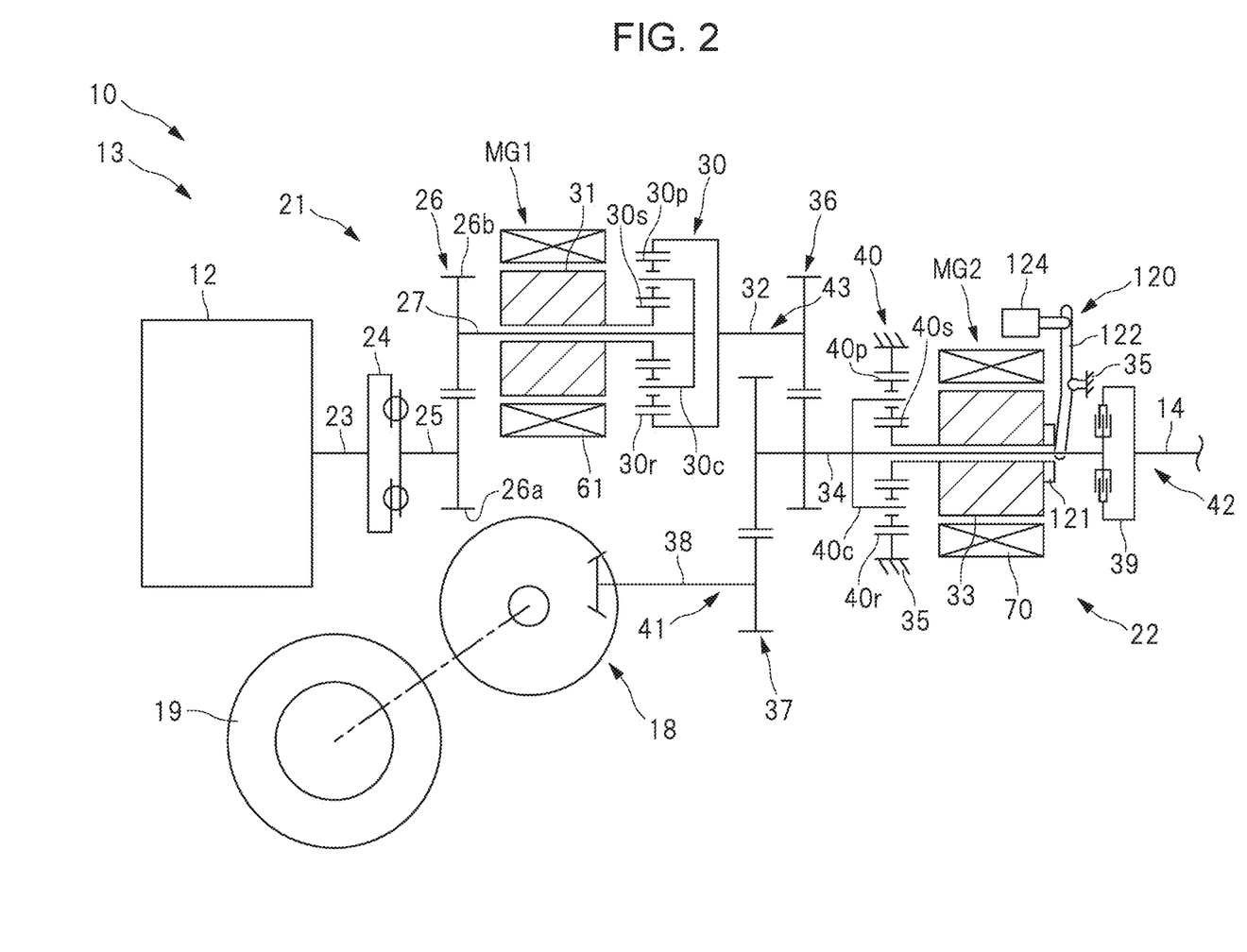
FIG. 2 is a diagram illustrating an example of the internal structure of a power unit.

FIG. 2 is a diagram illustrating an example of the internal structure of the power unit 13. As illustrated in FIG. 2, the power unit 13 includes a first drive system 21, which includes the engine 12 and the motor generator MG1, and a second drive system 22, which includes the motor generator MG2.

The first drive system 21 includes the engine 12 and the motor generator MG1, each of which serves as a power source. A transmission shaft 25 is coupled to a crankshaft 23 of the engine 12 via a damper mechanism 24 and is fixed to a drive gear 26a. In addition, a transmission shaft 27 is fixed to a driven gear 26b, which is engaged with the drive gear 26a, and is coupled to a rotor 31 of the motor generator MG1 via a planetary pinion train 30. The drive gear 26a and the driven gear 26b form a gear train 26.

The planetary pinion train 30, which couples the transmission shaft 27 and the rotor 31, includes a carrier 30c, which rotatably supports pinions 30p, a sun gear 30s, which is engaged with the pinions 30p, and a ring gear 30r, which is engaged with the pinions 30p and is also referred to as an internal gear. The transmission shaft 27 is coupled to the carrier 30c of the planetary pinion train 30. The rotor 31 of the motor generator MG1 is coupled to the sun gear 30s of the planetary pinion train 30. In addition, a first output shaft 32, which serves as an output shaft configured to output engine torque and motor torque, is coupled to the ring gear 30r of the planetary pinion train 30.

The second drive system 22 includes the motor generator MG2, which serves as a power source. A second output shaft 34 is coupled to a rotor 33 of the motor generator MG2 via a planetary pinion train 40. The planetary pinion train 40, which couples the rotor 33 and the second output shaft 34, includes a carrier 40c, which rotatably supports pinions 40p, a sun gear 40s, which is engaged with the pinions 40p, and a ring gear 40r, which is engaged with the pinions 40p and is also referred to as an internal gear. The second output shaft 34 is coupled to the carrier 40c of the planetary pinion train 40. The rotor 33 of the motor generator MG2 is coupled to the sun gear 40s of the planetary pinion train 40. The ring gear 40r of the planetary pinion train 40 is fixed to a housing 35 of the power unit 13.

In addition, the first output shaft 32 of the first drive system 21 is coupled to the second output shaft 34 of the second drive system 22 via a gear train 36. In addition, a front-wheel output shaft 38 is coupled to one end portion of the second output shaft 34 via a gear train 37, and the rear-wheel output shaft 14 is coupled to the other end portion of the second output shaft 34 via a coupling 39. The front-wheel output shaft 38 is coupled to the front wheels 19 via the front differential mechanism 18 described above. The rear-wheel output shaft 14 is coupled to the rear wheels 17 via the rear differential mechanism 16 described above.

As illustrated in FIG. 2, the sun gear (first gear) 40s of the planetary pinion train 40 is coupled to the rotor 33 of the motor generator (electric motor) MG2. In addition, the sun gear 40s and the front wheels (wheels) 19 are coupled to each other via a power transmission path 41 including, for example, the pinions (second gears) 40p, which are engaged with the sun gear 40s. In the example illustrated in the figure, the power transmission path 41 is formed by, for example, the pinions 40p, the carrier 40c, the second output shaft 34, the gear train 37, the front-wheel output shaft 38, and the front differential mechanism 18. In addition, as illustrated in FIGS. 1 and 2, the rear wheels (wheels) 17 and the sun gear 40s of the planetary pinion train 40 are coupled to each other via a power transmission path 42 including, for example, the pinions 40p, which are engaged with the sun gear 40s. In the example illustrated in the figure, the power transmission path 42 is formed by, for example, the pinions 40p, the carrier 40c, the second output shaft 34, the coupling 39, the rear-wheel output shaft 14, the propeller shaft 15, and the rear differential mechanism 16.

In addition, the first output shaft 32 and the second output shaft 34 are coupled to each other via the gear train 36. That is, a power transmission path 43 and the engine 12, which form the first drive system 21, are coupled to the power transmission paths 41 and 42, which form the second drive system 22, via the gear train 36. In the example illustrated in the figure, the power transmission path 43, which couples the engine 12 and the power transmission paths 41 and 42, is formed by, for example, the first output shaft 32, the ring gear 30r, the pinions 30p, the carrier 30c, the transmission shaft 27, the gear train 26, the transmission shaft 25, and the damper mechanism 24. In this manner, the engine 12 is coupled to the power transmission paths 41 and 42 via the power transmission path 43.

Figure 3:
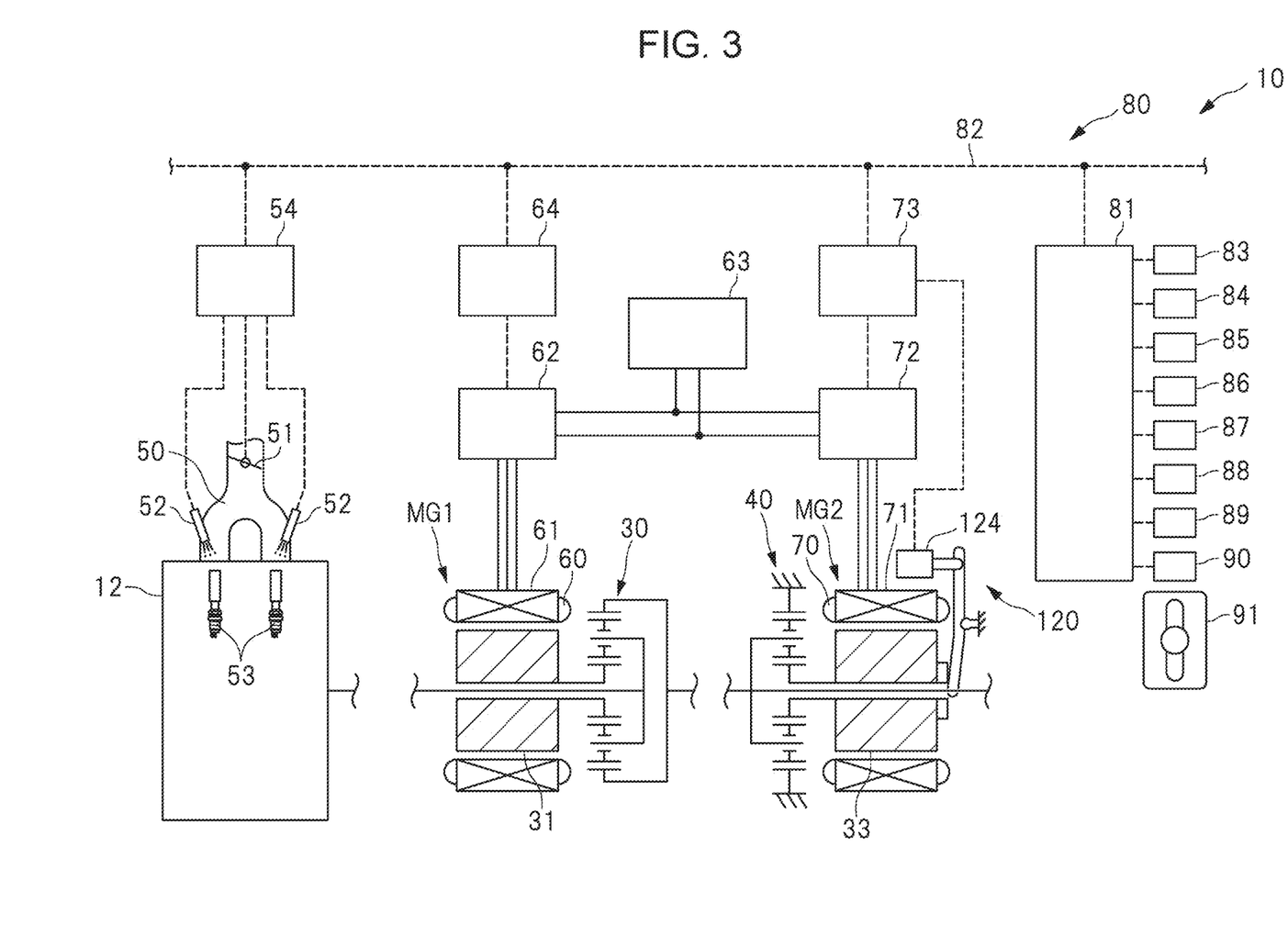
FIG. 3 is a diagram illustrating an example of a control system included in the vehicle driving apparatus.

FIG. 3 is a diagram illustrating an example of a control system 80 included in the vehicle driving apparatus 10. As illustrated in FIG. 3, an intake manifold 50 of the engine 12 is provided with a throttle valve 51, which is configured to adjust the amount of intake air. In addition, the engine 12 is provided with injectors 52, each of which is configured to inject fuel into an intake port and a cylinder, and ignition devices 53, each of which includes, for example, an ignition coil and an ignition plug. To control the engine torque and the engine rotation rate, an engine control unit 54 is coupled to, for example, the throttle valve 51, the injectors 52, and the ignition devices 53.

The motor generator MG1 includes a stator 61, around which a stator coil 60 is wound, and the rotor 31, which is accommodated in the stator 61 having a cylindrical shape. An inverter 62 is coupled to the stator 61 and a battery pack 63. In addition, a first motor control unit 64 is coupled to the inverter 62 to control the motor generator MG1 via the inverter 62. The first motor control unit 64 controls the inverter 62 including, for example, switching elements, thus controlling the motor torque and the motor rotation rate of the motor generator MG1. The motor generator MG1 is controllable to be in a power running state in which power running torque that increases the motor rotation rate is generated or in a regenerative state in which regenerative torque that reduces the motor rotation rate is generated. In addition, the regenerative state of the motor generator MG1 is also referred to as a power generation state.

The motor generator MG2 includes a stator 71, around which a stator coil 70 is wound, and the rotor 33, which is accommodated in the stator 71 having a cylindrical shape. An inverter 72 is coupled to the stator 71 and the battery pack 63. In addition, a second motor control unit 73 is coupled to the inverter 72 to control the motor generator MG2 via the inverter 72. The second motor control unit 73 controls the inverter 72 including, for example, switching elements, thus controlling the motor torque and the motor rotation rate of the motor generator MG2. The motor generator MG2 is controllable to be in a power running state in which power running torque that increases the motor rotation rate is generated or in a regenerative state in which regenerative torque that reduces the motor rotation rate is generated. In addition, the regenerative state of the motor generator MG2 is also referred to as a power generation state.

The control system 80 including electronic control units is provided in the vehicle driving apparatus 10 to control the power unit 13. As the electronic control units forming the control system 80, the engine control unit 54 and the motor control units 64 and 73 described above are provided, and a vehicle control unit 81, which is configured to output control signals to these control units 54, 64, and 73, is provided. These control units 54, 64, 73, and 81 are communicably coupled to each other via an in-vehicle network 82 such as a CAN. The vehicle control unit 81 sets operating targets for, for example, the engine 12 and the motor generators MG1 and MG2 on the basis of information received from various control units and various sensors described later. Then, control signals are generated according to such operating targets for, for example, the engine 12 and the motor generators MG1 and MG2 and are outputted to, for example, the engine control unit 54 and the motor control units 64 and 73.

There are an accelerator sensor 83, which is configured to detect the amount of operation of an accelerator pedal, and a brake sensor 84, which is configured to detect the amount of operation of a brake pedal, as sensors coupled to the vehicle control unit 81. In addition, there are a vehicle speed sensor 85, which is configured to detect a vehicle speed from the rotation speed of each of the front-wheel output shaft 38 and the rear-wheel output shaft 14, and an engine rotation sensor 86, which is configured to detect an engine rotation rate being the rotation speed of the crankshaft 23, as sensors coupled to the vehicle control unit 81. In addition, there are a first motor rotation sensor 87, which is configured to detect a motor rotation rate being the rotor rotation speed of the motor generator MG1, and a second motor rotation sensor 88, which is configured to detect a motor rotation rate being the rotor rotation speed of the motor generator MG2, as sensors coupled to the vehicle control unit 81. Furthermore, the vehicle control unit 81 is coupled to a start switch 89, which is configured to be operated by a driver who drives the vehicle 11 at the time of the start-up of the control system 80, and a position switch 91, which is configured to detect the position of a select lever 90 operated by a driver who drives the vehicle 11.

Figure 4:
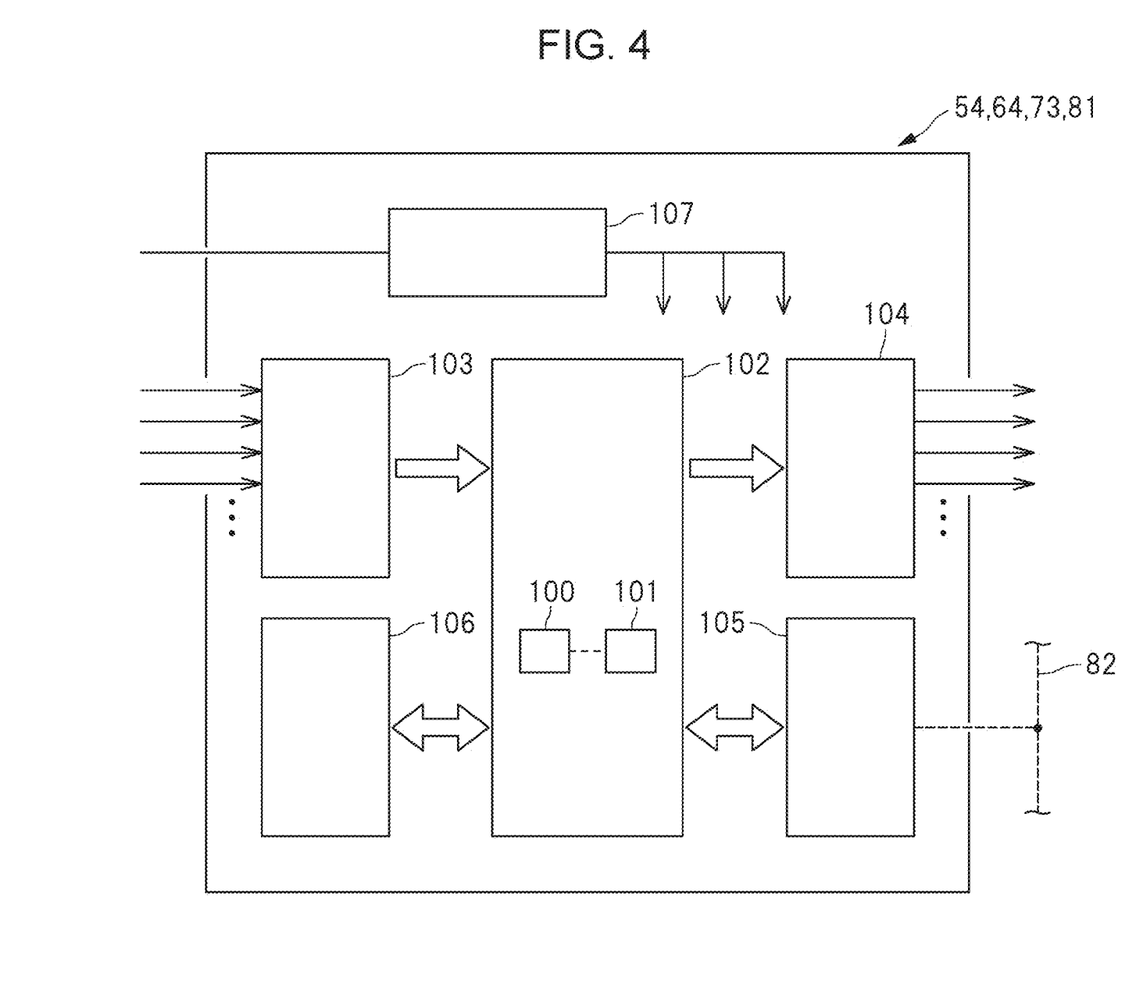
FIG. 4 is a diagram illustrating an example of the basic structure of each of control units.

FIG. 4 is a diagram illustrating an example of the basic structure of each of the control units 54, 64, 73, and 81. As illustrated in FIG. 4, the control units 54, 64, 73, and 81, which are electronic control units, each include a microcontroller 102, in which, for example, a processor 100 and a main memory (memory) 101 are incorporated. A predetermined program is stored in the main memory 101 and is executed by the processor 100. The processor 100 and the main memory 101 are communicably coupled to each other. Multiple processors 100 may be incorporated in the microcontroller 102, and multiple main memories 101 may be incorporated in the microcontroller 102.

In addition, for example, an input circuit 103, a drive circuit 104, a communication circuit 105, an external memory 106, and a power supply circuit 107 are provided in each of the control units 54, 64, 73, and 81. The input circuit 103 converts signals received from various sensors to signals capable of being received by the microcontroller 102. The drive circuit 104 generates drive signals for various devices such as the inverters 62 and 72 described above on the basis of signals outputted from the microcontroller 102. The communication circuit 105 converts signals outputted from the microcontroller 102 to communication signals for different control units. In addition, the communication circuit 105 converts communication signals received from different control units to signals capable of being received by the microcontroller 102. Furthermore, the power supply circuit 107 supplies a stable power supply voltage to each of the microcontroller 102, the input circuit 103, the drive circuit 104, the communication circuit 105, and the external memory 106, for example. In addition, for example, a program and various data are stored in the external memory 106 including, for example, a nonvolatile memory.

Figure 5:
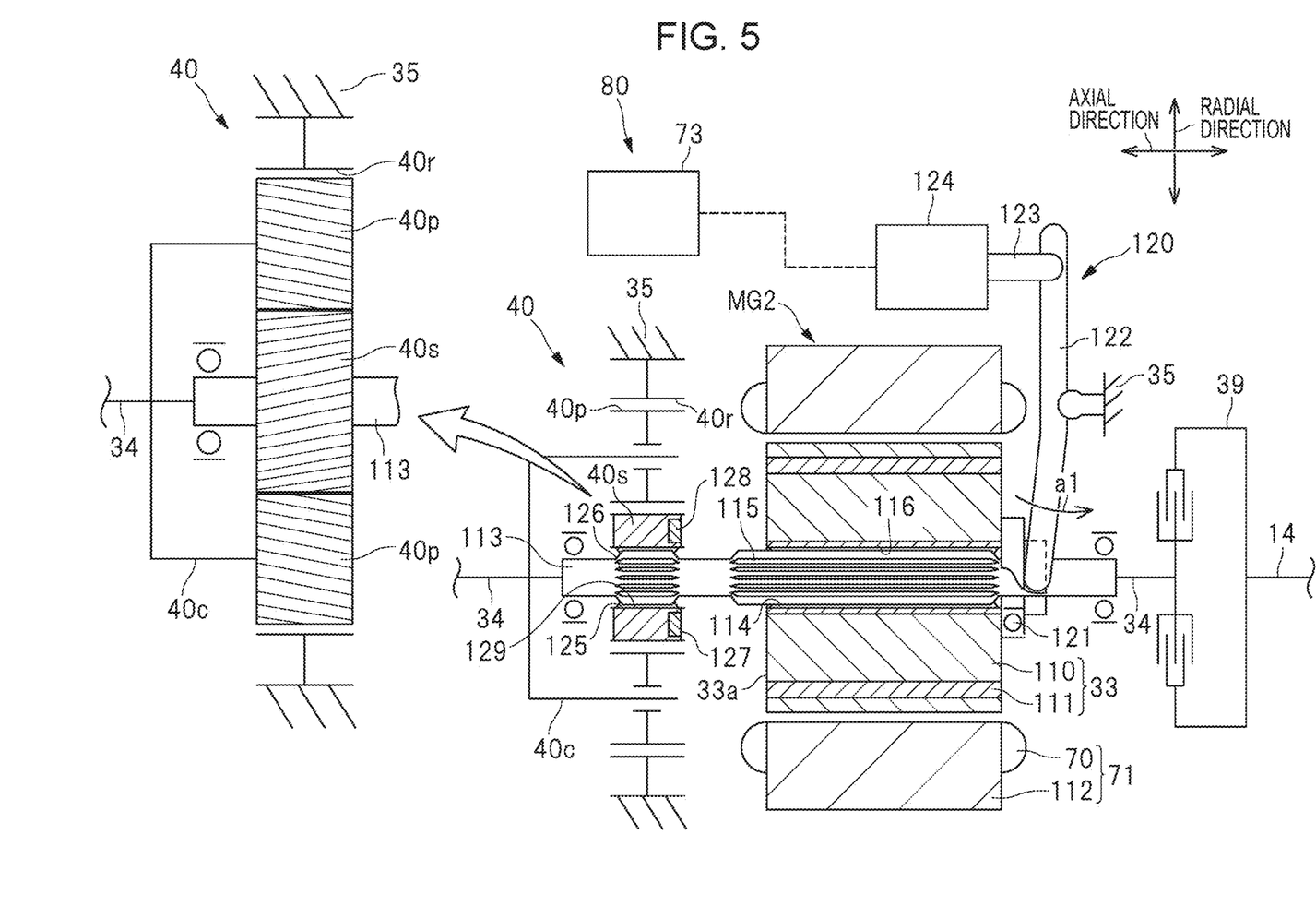
FIG. 5 is a diagram illustrating examples of a motor generator and a planetary pinion train.
Figure 6:
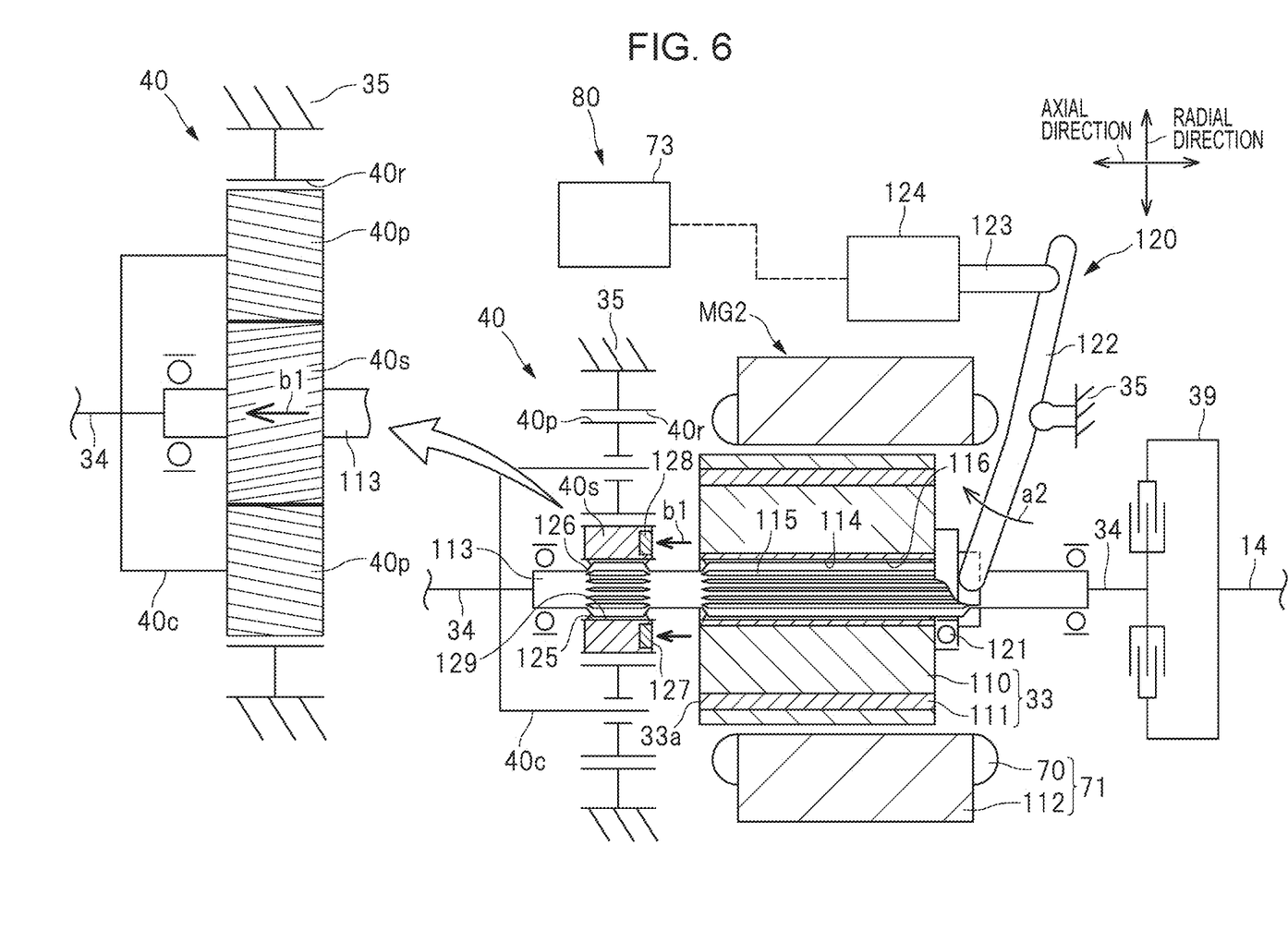
FIG. 6 is a diagram illustrating the examples of the motor generator and the planetary pinion train.

Next, the structure of each of the motor generator MG2 and the sun gear 40s will be described in detail. FIGS. 5 and 6 are diagrams each illustrating examples of the motor generator MG2 and the planetary pinion train 40. As illustrated in FIG. 5, the motor generator MG2 includes the rotor 33, which has a cylindrical shape, and the stator 71, which is disposed on the outside of the rotor 33 in a radial direction. The rotor 33 of the motor generator MG2 includes a rotor core 110, which includes laminated electromagnetic steel sheets, and permanent magnets 111, which are provided in the rotor core 110. In addition, the stator 71 fixed to the housing 35 includes a stator core 112, which includes laminated electromagnetic steel sheets, and the stator coil 70, which is wound around the stator core 112.

To support the rotor 33 of the motor generator MG2, a rotor shaft 113 having a hollow shape is provided on the outside of the second output shaft 34 in a radial direction. Internal spline teeth 114 are formed on a through hole 116 passing through the center of rotation of the rotor 33. External spline teeth 115 are formed on the outer peripheral surface of the rotor shaft 113. In addition, the rotor shaft 113 is inserted into the through hole 116 of the rotor 33. The internal spline teeth 114 and the external spline teeth 115 are slidably engaged with each other. That is, the rotor 33 of the motor generator MG2 is provided movably in the axial direction relative to the rotor shaft 113.

In addition, the motor generator MG2 includes a slide mechanism 120, which is configured to move the rotor 33 in the axial direction. The slide mechanism 120 includes a bearing 121, which is attached to the rotor 33, a lever member 122, which is tiltably supported by the housing 35, and an electric actuator (actuator) 124, which includes a push rod 123. One end portion of the lever member 122 is coupled to the bearing 121. The other end portion of the lever member 122 is coupled to the push rod 123. In addition, the second motor control unit 73 is coupled to the electric actuator 124. The electric actuator 124 is controlled on the basis of a control signal sent from the second motor control unit 73. Furthermore, the electric actuator 124 is capable of operating in a first state of pushing the push rod 123 or in a second state of drawing the push rod 123.

As illustrated in FIG. 5, the push rod 123 of the electric actuator 124 is drawn. As a result, it is possible to rotate the lever member 122 in the direction of an arrow a1 and to thus move the rotor 33 to a first position where the rotor 33 is disposed on the inside of the stator 71 in a radial direction. In this manner, the movement of the rotor 33 to the first position enables substantially the entire outer peripheral surface of the rotor 33 to face the inner peripheral surface of the stator 71. Thus, it is possible to maintain a sufficient amount of effective magnetic flux of the motor generator MG2.

On the other hand, as illustrated in FIG. 6, the push rod 123 of the electric actuator 124 is pushed. As a result, it is possible to rotate the lever member 122 in the direction of an arrow a2 and to thus move the rotor 33 to a second position where the rotor 33 is closer to the sun gear 40s than the first position. In this manner, the movement of the rotor 33 to the second position enables a part of the rotor 33 to project from the inside of the stator 71. Thus, it is possible to reduce the amount of effective magnetic flux and to thus reduce the counter electromotive force during rotation thereof. The control system 80 moves the rotor 33 to the second position in a preset operation region of the motor generator MG2 to reduce the counter electromotive force, thus increasing the motor rotation rate of the motor generator MG2. In addition, the motor generator MG2 is also referred to as a variable magnetic flux motor.

As illustrated in FIG. 5, the sun gear 40s facing an end face 33a of the rotor 33 is disposed close to the rotor 33 of the motor generator MG2. In addition, internal spline teeth 125 are formed on a through hole 129 passing through the center of rotation of the sun gear 40s, and external spline teeth 126 are formed on the outer peripheral surface of the rotor shaft 113. Furthermore, the rotor shaft 113 is inserted into the through hole 129 of the sun gear 40s, and the internal spline teeth 125 and the external spline teeth 126 are slidably engaged with each other. That is, the sun gear 40s of the planetary pinion train 40 is provided movably in the axial direction relative to the rotor shaft 113. In addition, a permanent magnet 128 is provided in a side surface 127, which faces the end face 33a of the rotor 33, of the sun gear 40s. A magnetic pole of the permanent magnet 128 is set to repel the rotor 33. That is, the magnetic pole generated at the side surface 127 of the sun gear 40s by the permanent magnet 128 and the magnetic pole generated at the end face 33a of the rotor 33 are set to be equal to each other. Furthermore, as illustrated in an enlarged part of FIG. 5, the sun gear 40s and the pinions 40p of the planetary pinion train 40 are helical gears whose tooth traces are inclined relative to the axial direction.

Figure 7:
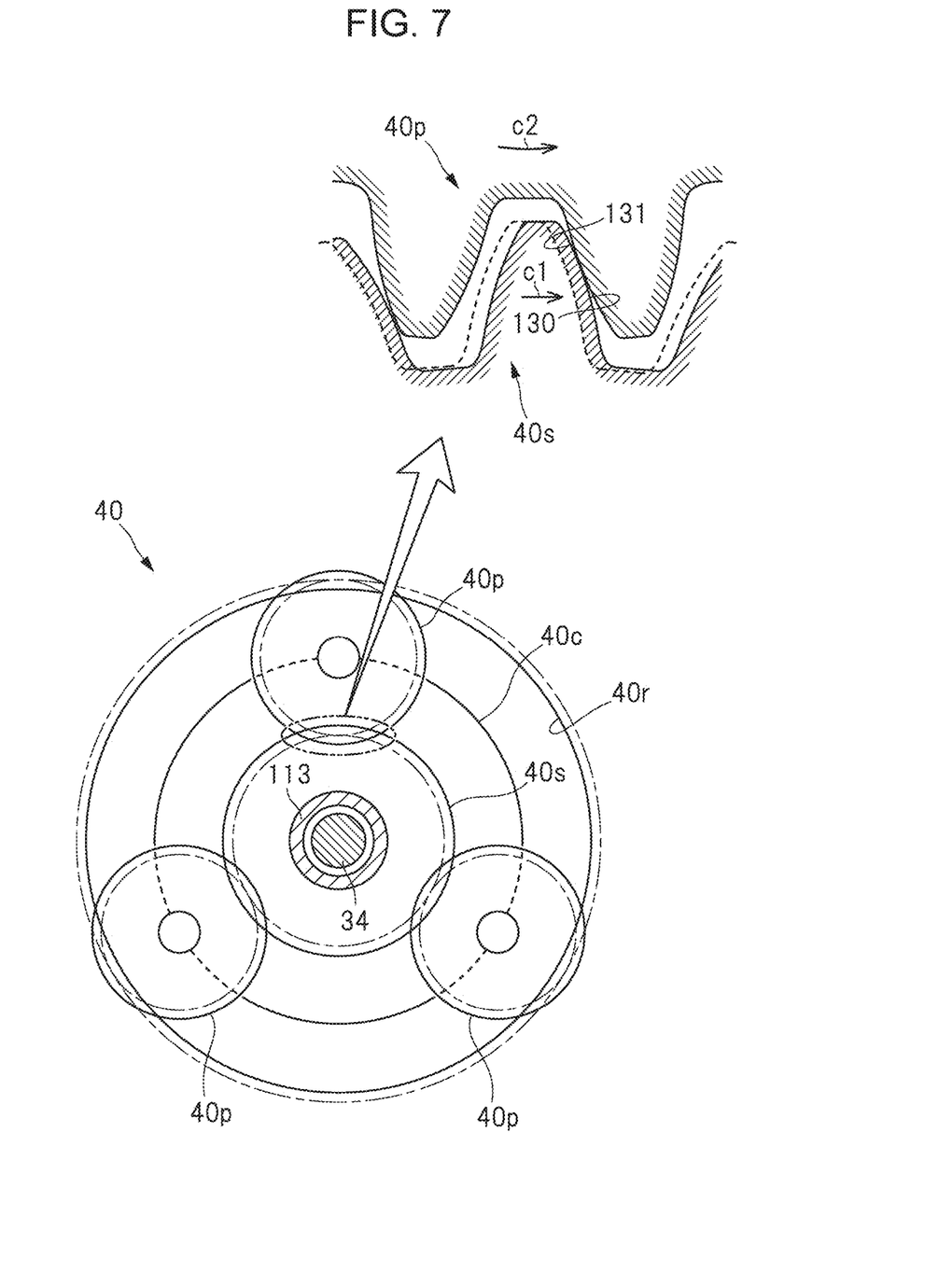
FIG. 7 is a diagram illustrating the planetary pinion train when viewed in the axial direction.

Backlash reducing control performed by the electric actuator 124 will be described. As illustrated in FIG. 6, the push rod 123 of the electric actuator 124 is pushed to bring the rotor 33 close to the sun gear 40s. As a result, it is possible to increase the magnetic force applied between the rotor 33 and the sun gear 40s and to thus urge the sun gear 40s in the axial direction. That is, bringing the rotor 33 close to the sun gear 40s enables the sun gear 40s to be urged in the direction of an arrow b1 due to magnetic force. FIG. 7 is a diagram illustrating the planetary pinion train 40 when viewed in the axial direction. As described above, the sun gear 40s urged in the axial direction is a helical gear whose tooth trace is inclined. Thus, as represented by an arrow c1 in FIG. 7, it is possible to move a tooth surface 130 of the sun gear 40s toward a tooth surface 131 of the pinion 40p. Then, the tooth surface 130 of the sun gear 40s is pushed against the tooth surface 131 of the pinion 40p. Thus, it is possible to slightly rotate the pinion 40p in the direction of an arrow c2. That is, it is possible to reduce the backlash between the sun gear 40s and the pinion 40p.

Figure 8:
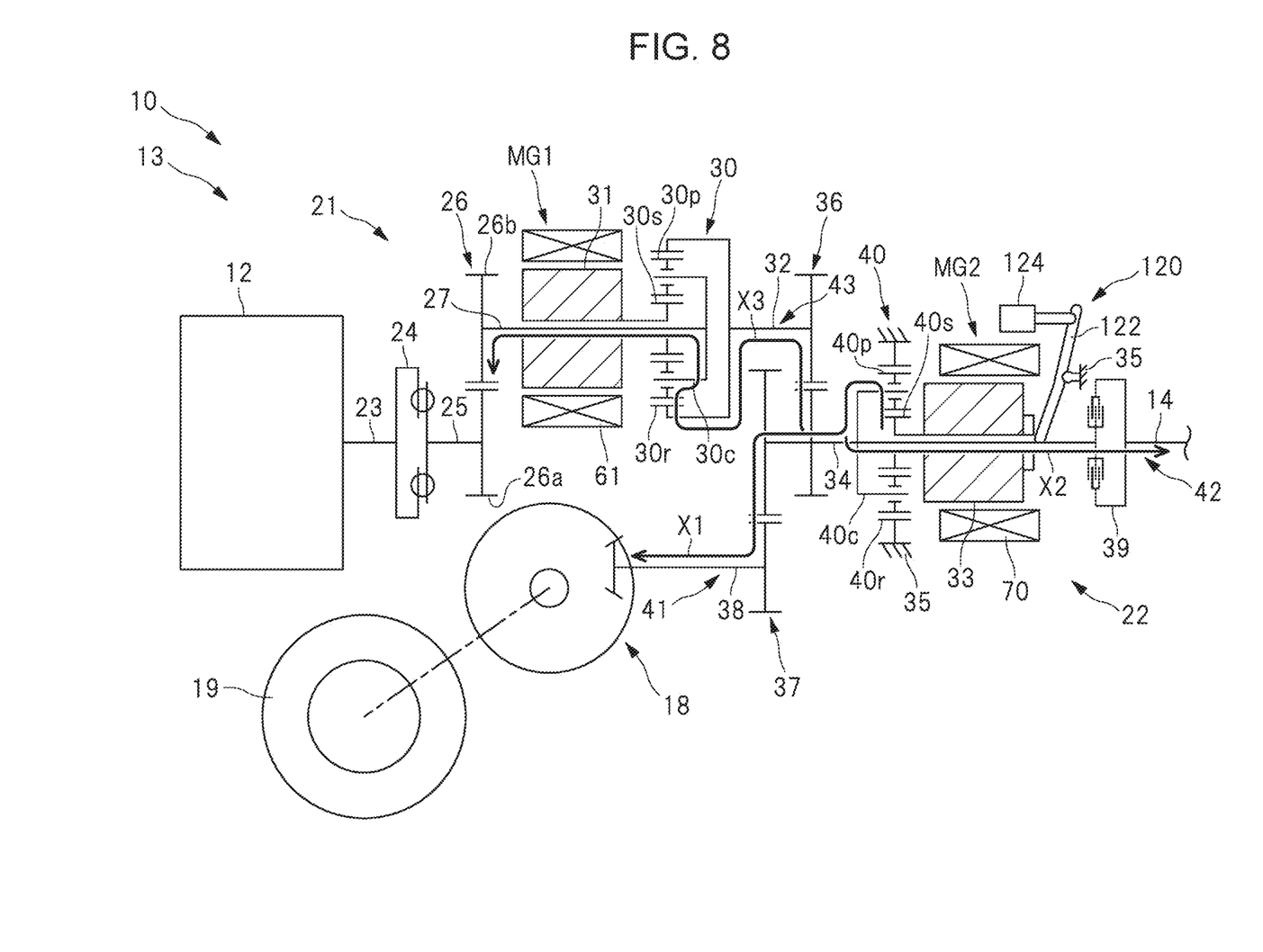
FIG. 8 is a diagram illustrating a situation in which slight rotation of pinions is transmitted to power transmission paths.

Such slight rotation of the pinions 40p is transmitted to the power transmission paths 41 to 43 described above. FIG. 8 is a diagram illustrating a situation in which slight rotation of the pinions 40p is transmitted to the power transmission paths 41 to 43. As represented by an arrow X1 in FIG. 8, the slight rotation of the pinions 40p is transmitted to the power transmission path 41 while reducing the backlashes between machine components. That is, the slight rotation of the pinions 40p is transmitted to, for example, the carrier 40c, the second output shaft 34, the gear train 37, the front-wheel output shaft 38, and the front differential mechanism 18 while reducing the backlashes between the machine components.

In addition, as represented by an arrow X2 in FIG. 8, the slight rotation of the pinions 40p is transmitted to the power transmission path 42 while reducing the backlashes between machine components. That is, the slight rotation of the pinions 40p is transmitted to, for example, the carrier 40c, the second output shaft 34, the coupling 39, and the rear-wheel output shaft 14 while reducing the backlashes between the machine components. Furthermore, as represented by an arrow X3 in FIG. 8, the slight rotation of the pinions 40p is transmitted to the power transmission path 43 while reducing the backlashes between machine components. That is, the slight rotation of the pinions 40p is transmitted to, for example, the carrier 40c, the second output shaft 34, the gear train 36, the first output shaft 32, the ring gear 30r, the pinions 30p, the carrier 30c, the transmission shaft 27, the gear train 26, the transmission shaft 25, and the damper mechanism 24 while reducing the backlashes between the machine components.

As described so far, the push rod 123 of the electric actuator 124 is pushed to bring the rotor 33 close to the sun gear 40s. Thus, it is possible to urge the sun gear 40s in the axial direction due to magnetic force. As a result, the tooth surface 130 of the sun gear 40s can be pushed against the tooth surface 131 of the pinion 40p to slightly rotate the pinion 40p. Thus, it is possible to reduce the backlashes in the power transmission paths 41 to 43. In this manner, a reduction in backlash in each of the power transmission paths 41 to 43 enables a reduction in the gear rattle of each of the gear trains forming the power transmission paths 41 to 43 even when the torque flow in each of the power transmission paths 41 to 43 is reversed.

In the example illustrated in the figure, in the backlash reducing control, the tooth surface 130 of the sun gear 40s is pushed against the tooth surface 131 of the pinion 40p. However, the direction in which a tooth surface is pushed may be any of a driving direction and a coasting direction. Whether a drive side tooth surface is pushed or a coast side tooth surface is pushed is determined from the effect of reducing the gear rattle of each of the gear trains of the power transmission paths 41 to 43. It is possible to set the direction in which a tooth surface is pushed on the basis of the orientation of the tooth trace of each of the sun gear 40s and the pinions 40p.

In the above description, a repelling magnetic force for separating the sun gear 40s from the rotor 33 is applied, but the disclosure is not limited thereto. An attracting magnetic force for bringing the sun gear 40s close to the rotor 33 may be applied. In addition, in the above description, the permanent magnet 128 is attached to the sun gear 40s, but the disclosure is not limited thereto. The permanent magnet 128 may be removed from the sun gear 40s. In this manner, even when the permanent magnet 128 is removed from the sun gear 40s, it is possible to urge the sun gear 40s made of a magnetic substance toward the rotor 33 due to an attracting magnetic force.

Figure 9:
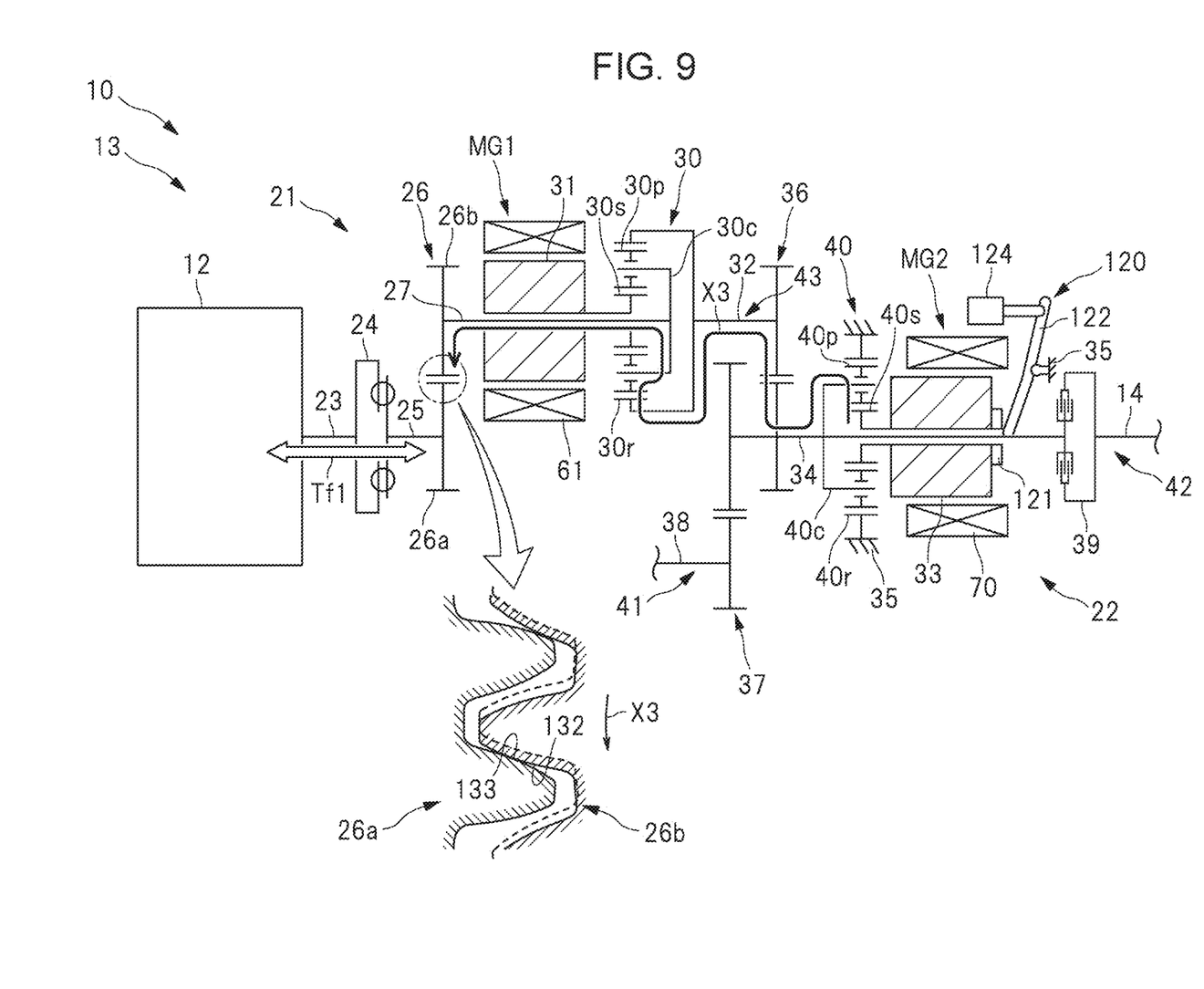
FIG. 9 is a diagram illustrating an example of the timing of performing backlash reducing control.

FIG. 9 is a diagram illustrating an example of the timing of performing backlash reducing control. When the engine 12 is cranked in a parking range or a running range, for example, the control system 80 performs the backlash reducing control with the electric actuator 124. That is, the control system 80 starts the engine 12 in a state in which the rotor 33 is moved to the second position by the electric actuator 124. At the time of starting the engine 12, the engine 12 is cranked by the motor generator MG1.

As illustrated in FIG. 9, the rotor 33 is brought close to the sun gear 40s by the electric actuator 124, and the sun gear 40s is urged in the axial direction due to magnetic force. Thus, it is possible to reduce the backlashes in the power transmission path 43 (arrow X3). That is, it is possible to push a tooth surface 132 of the driven gear 26b forming the power transmission path 43 against a tooth surface 133 of the drive gear 26a and to thus reduce the backlash of the gear train 26. As a result, even when a torque fluctuation Tf1 generated due to cranking of the engine 12 is received by the gear train 26, it is possible to reduce the gear rattle of the gear train 26. The part where gear rattle is reduced is not limited to the gear train 26, and it is possible to reduce the gear rattle of each of the gear trains forming the power transmission path 43.

Figure 10:
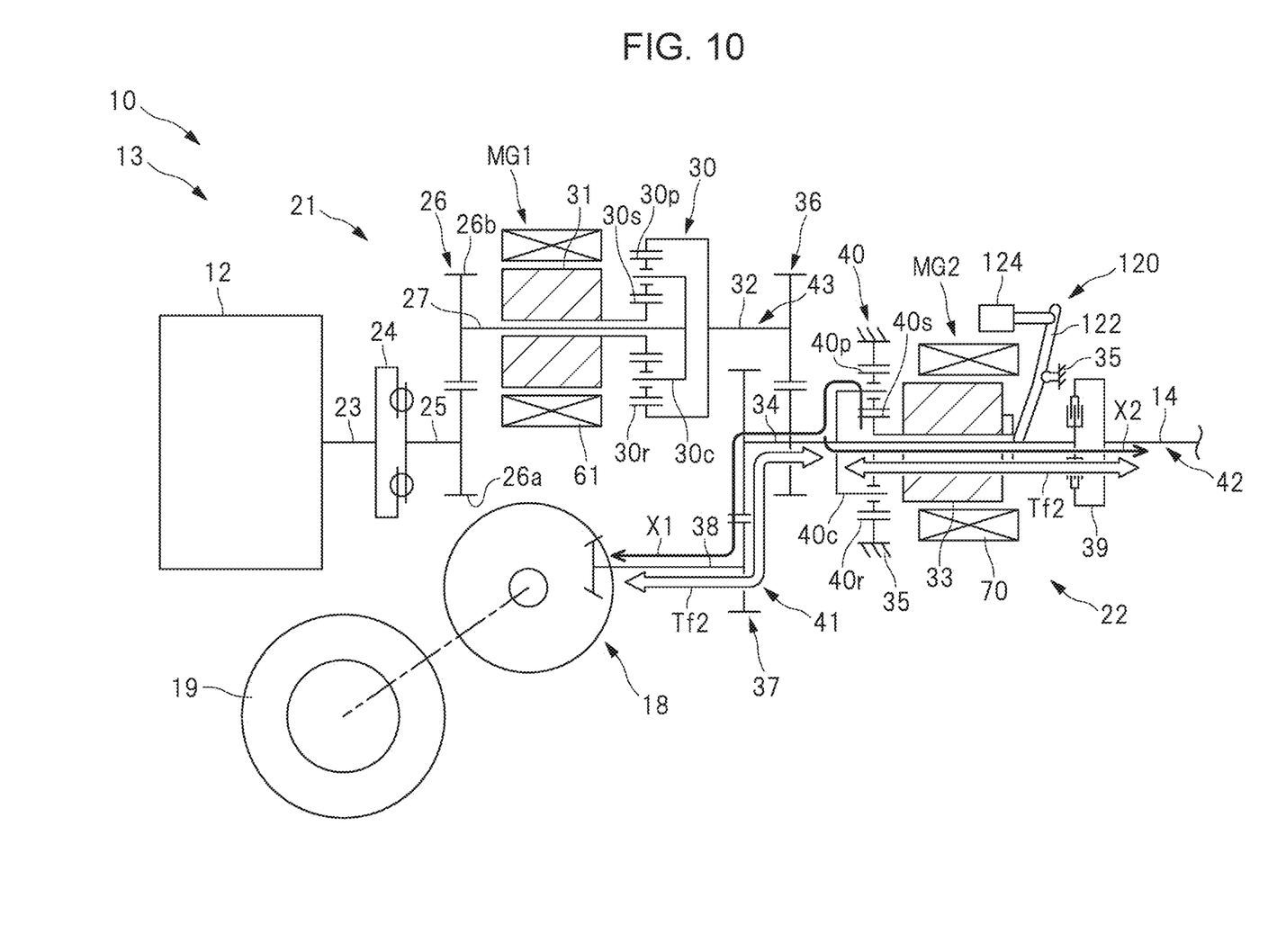
FIG. 10 is a diagram illustrating an example of the timing of performing the backlash reducing control.

FIG. 10 is a diagram illustrating an example of the timing of performing the backlash reducing control. When the vehicle 11 runs at a constant speed with the motor generator MG2, for example, the control system 80 performs the backlash reducing control using the electric actuator 124. That is, to maintain a predetermined vehicle speed, the control system 80 switches the motor generator MG2 alternately between the power running state and the regenerative state in the state in which the rotor 33 is moved to the second position by the electric actuator 124.

As illustrated in FIG. 10, the rotor 33 is brought close to the sun gear 40s by the electric actuator 124, and the sun gear 40s is urged in the axial direction due to magnetic force. Thus, it is possible to reduce the backlashes in the power transmission paths 41 and 42 (arrows X1 and X2). That is, the tooth surfaces of each of the gear trains forming the power transmission path 41 can be pushed against each other, and the tooth surfaces of each of the gear trains forming the power transmission path 42 can be pushed against each other. Thus, it is possible to reduce the backlash of each of these gear trains. As a result, even when the power running state and the regenerative state of the motor generator MG2 are alternately repeated to maintain a predetermined speed, and a torque fluctuation Tf2 is received by each of the gear trains of the power transmission paths 41 and 42, it is possible to reduce the gear rattle of each of the gear trains forming the power transmission paths 41 and 42.

Figure 11:
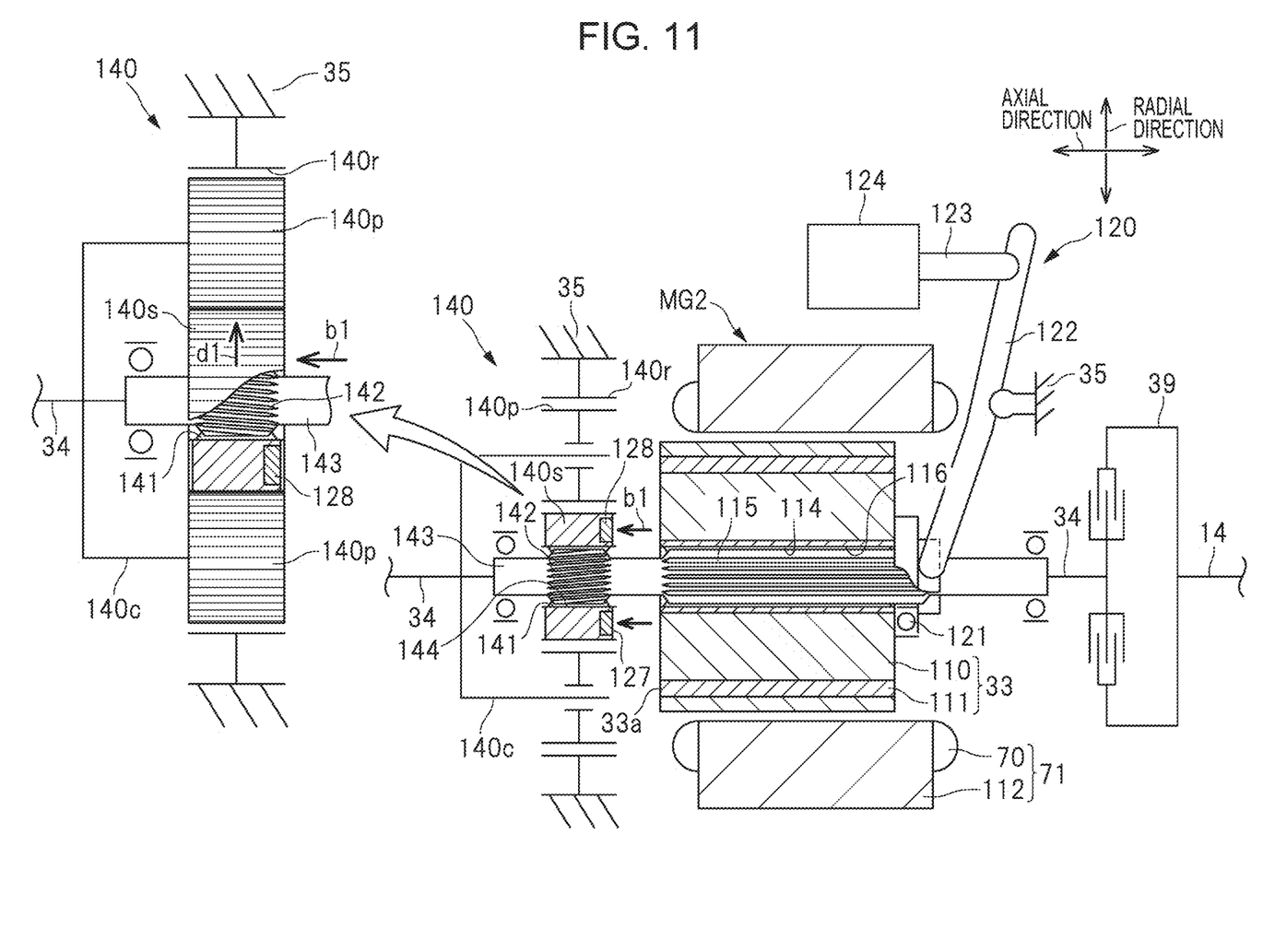
FIG. 11 is a diagram illustrating modification examples of a sun gear, the pinions, and a rotor shaft.

In the above description, helical gears are used as the sun gear 40s and the pinions 40p of the planetary pinion train 40, but the disclosure is not limited thereto. Spur gears may be used as the sun gear 40s and the pinions 40p. FIG. 11 is a diagram illustrating modification examples of the sun gear 40s, the pinions 40p, and the rotor shaft 113. A planetary pinion train 140 illustrated in FIG. 11 is a gear train serving similar to the planetary pinion train 40 but differs from the planetary pinion train 40 in tooth trace. Thus, in the following description, the planetary pinion train has the reference sign 140. Similarly, a rotor shaft 143 illustrated in FIG. 11 is a rotating shaft serving similar to the rotor shaft 113 but differs from the rotor shaft 113 in spline teeth. Thus, in the following description, the rotor shaft has the reference sign 143. In addition, in FIG. 11, components similar to those illustrated in FIG. 6 have the same reference signs, and descriptions thereof are omitted.

As illustrated in FIG. 11, a sun gear (first gear) 140s and pinions (second gears) 140p of the planetary pinion train 140 are spur gears whose tooth traces are parallel to the axial direction. In addition, internal spline teeth 141 are formed on a through hole 144 passing through the center of rotation of the sun gear 140s, and external spline teeth 142 are formed on the outer peripheral surface of the rotor shaft 143. Furthermore, the rotor shaft 143 is inserted into the through hole 144 of the sun gear 140s, and the internal spline teeth 141 and the external spline teeth 142 are slidably engaged with each other. In addition, the internal spline teeth 141 and the external spline teeth 142 are helical splines whose tooth traces are inclined relative to the axial direction. That is, the sun gear 140s of the planetary pinion train 140 is provided movably in the axial direction while rotating relative to the rotor shaft 143.

As illustrated in FIG. 11, the push rod 123 of the electric actuator 124 is pushed to bring the rotor 33 close to the sun gear 140s. Thus, it is possible to urge the sun gear 140s in the axial direction due to the magnetic force applied between the rotor 33 and the sun gear 140s. That is, bringing the rotor 33 close to the sun gear 140s enables the sun gear 140s to be urged in the direction of the arrow b1 due to magnetic force. The sun gear 140s rotates in the direction of an arrow d1 when moving in the axial direction. Thus, it is possible to move a tooth surface of the sun gear 140s toward a tooth surface of a pinion 140p. Then, the tooth surface of the sun gear 140s is pushed against the tooth surface of the pinion 140p. As a result, it is possible to slightly rotate the pinion 140p and to thus reduce the backlashes in the power transmission paths 41 to 43. In this manner, a reduction in backlash in each of the power transmission paths 41 to 43 enables a reduction in the gear rattle of each of the gear trains forming the power transmission paths 41 to 43 even when the torque flow in each of the power transmission paths 41 to 43 is reversed.

Figure 12:
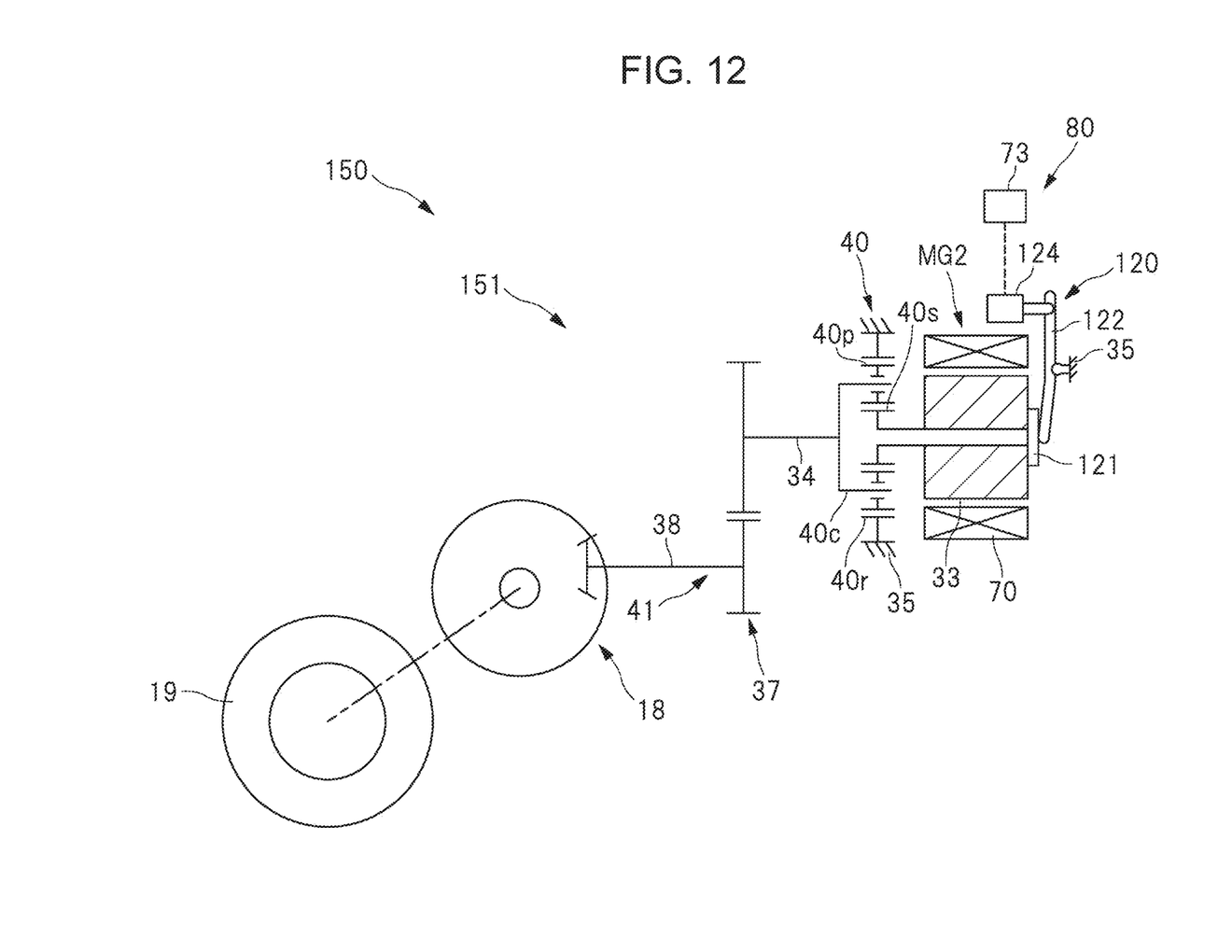
FIG. 12 is a diagram illustrating an example of a power unit included in a vehicle driving apparatus that is an embodiment of the disclosure.

In the above description, the vehicle driving apparatus 10 is provided to the hybrid vehicle 11 including the engine 12 and the motor generators MG1 and MG2, but the disclosure is not limited thereto. For example, such a vehicle driving apparatus may be provided to an electric automobile including the motor generator MG2 alone serving as a power source. FIG. 12 is a diagram illustrating an example of a power unit 151 included in a vehicle driving apparatus 150, which is a further embodiment of the disclosure. In FIG. 12, components similar to those illustrated in FIG. 2 have the same reference signs, and descriptions thereof are omitted.

As illustrated in FIG. 12, the sun gear (first gear) 40s of the planetary pinion train 40 is coupled to the rotor 33 of the motor generator (electric motor) MG2. In addition, the sun gear 40s and the front wheels (wheels) 19 are coupled to each other via the power transmission path 41 including, for example, the pinions (second gears) 40p, which are engaged with the sun gear 40s. In the example illustrated in the figure, the power transmission path 41 is formed by, for example, the pinions 40p, the carrier 40c, the second output shaft 34, the gear train 37, the front-wheel output shaft 38, and the front differential mechanism 18. In addition, the slide mechanism 120, which is configured to move the rotor 33 in the axial direction, is provided in the motor generator MG2.

In this manner, even when an electric automobile including the motor generator MG2 alone runs at a constant speed with the motor generator MG2, for example, the backlash reducing control using the electric actuator 124 is performed. That is, to maintain a predetermined vehicle speed, the control system 80 switches the motor generator MG2 alternately between the power running state and the regenerative state in the state in which the rotor 33 is moved to the second position by the electric actuator 124. As described above, the rotor 33 is brought close to the sun gear 40s by the electric actuator 124, and the sun gear 40s is urged in the axial direction due to magnetic force. Thus, it is possible to reduce the backlashes in the power transmission path 41. As a result, even when the power running state and the regenerative state of the motor generator MG2 are alternately repeated to maintain a predetermined vehicle speed, and a torque fluctuation is received by each of the gear trains of the power transmission path 41, it is possible to reduce the gear rattle of each of the gear trains forming the power transmission path 41.

The disclosure is not limited to the above embodiments, and the embodiments can be variously modified without departing from the gist of the disclosure. In the above description, the two motor generators MG1 and MG2 are provided to the power unit 13, but the disclosure is not limited thereto. A single motor generator may be provided to the power unit 13. In addition, in the above description, the slide mechanism 120 is provided in the motor generator MG2, but the disclosure is not limited thereto. The slide mechanism 120 may be provided in the motor generator MG1 alone or in both the motor generators MG1 and MG2. In addition, in the above description, the electric actuator 124 is used as an actuator configured to move the rotor 33, but the disclosure is not limited thereto. A hydraulic actuator may be used as such an actuator. In addition, in the above description, the rotor 33 is moved in the axial direction by the lever member 122, but the disclosure is not limited thereto. For example, a hydraulic chamber serving as a hydraulic actuator may be formed at an end portion of the rotor 33 to supply hydraulic oil to the hydraulic chamber, thus moving the rotor 33 in the axial direction.

As described above, the sun gear 40s is urged in the axial direction by the rotor 33 to push the tooth surface 130 of the sun gear 40s against the tooth surface 131 of the pinion 40p, thus slightly rotating the pinion 40p. Such slight rotation of the pinions 40p reduces the backlashes in the power transmission paths 41 to 43. However, it does not matter if the backlashes between all the machine components forming the power transmission paths 41 to 43 are not eliminated, and it is sufficient that the tooth surface 130 of the sun gear 40s be at least pushed against the tooth surface 131 of the pinion 40p. In addition, in the above description, the sun gear 40s of the planetary pinion train 40 is used as the first gear, and the pinions 40p of the planetary pinion train 40 are used as the second gears, but the disclosure is not limited to such gears forming a planetary pinion train.

In the above description, a spline structure including the internal spline teeth 114 and the external spline teeth 115 is used as a structure supporting the rotor shaft 113 and the rotor 33, but the disclosure is not limited thereto. For example, a ball spline structure in which rolling elements are interposed between the rotor shaft 113 and the rotor 33 may be used as a structure supporting the rotor shaft 113 and the rotor 33. Similarly, a spline structure including the internal spline teeth 125 and the external spline teeth 126 is used as a structure supporting the rotor shaft 113 and the sun gear 40s, and a spline structure including the internal spline teeth 141 and the external spline teeth 142 is used as a structure supporting the rotor shaft 143 and the sun gear 140s, but the disclosure is not limited thereto. For example, a ball spline structure in which rolling elements are interposed between the rotor shaft 113 and the sun gear 40s may be used as a structure supporting the rotor shaft 113 and the sun gear 40s.

According to an aspect of the disclosure, the rotor is moved to the second position by the actuator, the first gear is urged in the axial direction due to the magnetic force applied between the rotor and the first gear, and the tooth surface of the first gear is pushed against the tooth surface of the second gear. Thus, it is possible to reduce a gear rattle.

The invention claimed is:

1. A vehicle driving apparatus to be provided in a vehicle, the vehicle driving apparatus comprising:
    an electric motor comprising a rotor and a stator, the rotor being provided movably in an axial direction relative to a rotor shaft, the stator being disposed on an outside of the rotor in a radial direction;
    a first gear provided movably in the axial direction relative to the rotor shaft, the first gear being disposed so as to face an end face of the rotor, and the first gear comprising a permanent magnet provided on a side surface of the first gear facing the end face of the rotor, a magnetic pole of the permanent magnet being set to repel the rotor, the magnetic pole generated at the side surface of the first gear by the permanent magnet and a magnetic pole generated at the end face of the rotor being set to be equal to each other;
    a power transmission path comprising a second gear engaged with the first gear, the power transmission path coupling the first gear and wheels of the vehicle to each other; and
    an actuator configured to move the rotor to a first position where the rotor is disposed on an inside of the stator in the radial direction and a second position where the rotor is closer to the first gear than the first position,
    wherein upon the rotor being moved to the second position by the actuator, the first gear is urged in the axial direction due to an increase in a magnetic force applied between the rotor and the permanent magnet of the first gear that repels the first gear away from the rotor to push a tooth surface of the first gear against a tooth surface of the second gear to reduce backlash between the first gear and the second gear.

2. The vehicle driving apparatus according to claim 1, wherein the first gear and the second gear are helical gears.

3. The vehicle driving apparatus according to claim 1, further comprising:
    an engine coupled to the power transmission path; and
    a control system comprising a processor and a memory, the processor and the memory being communicably coupled to each other, the control system being configured to control the engine and the actuator,
    wherein the control system is configured to start the engine in a state in which the rotor is moved to the second position by the actuator.

4. The vehicle driving apparatus according to claim 1, further comprising
    a control system comprising a processor and a memory, the processor and the memory being communicably coupled to each other, the control system being configured to control the electric motor and the actuator,
    wherein the control system is configured to switch the electric motor alternately between a power running state and a regenerative state in a state in which the rotor is moved to the second position by the actuator.

5. The vehicle driving apparatus according to claim 1, wherein the actuator comprises an electric actuator including a push rod, a bearing attached to the rotor, and a lever member tiltably supported by a housing, wherein one end portion of the lever member is coupled to the bearing and another end portion of the lever member is coupled to the push rod.

6. The vehicle driving apparatus according to claim 1, wherein internal spline teeth are formed on a through hole passing through a center of rotation of the rotor, external spline teeth are formed on an outer peripheral surface of the rotor shaft, and the internal spline teeth and the external spline teeth are slidably engaged with each other.

7. A vehicle driving apparatus to be provided in a vehicle, the vehicle driving apparatus comprising:
    an electric motor comprising a rotor and a stator, the rotor being provided movably in an axial direction relative to a rotor shaft, the stator being disposed on an outside of the rotor in a radial direction, wherein internal spline teeth are formed on a through hole passing through a center of rotation of the rotor, external spline teeth are formed on an outer peripheral surface of the rotor shaft, and the internal spline teeth and the external spline teeth are slidably engaged with each other;
    a first gear provided movably in the axial direction relative to the rotor shaft, the first gear being disposed so as to face an end face of the rotor, and the first gear comprising a permanent magnet provided on a side surface of the first gear facing the end face of the rotor, a magnetic pole of the permanent magnet being set to repel the rotor;
    a power transmission path comprising a second gear engaged with the first gear, the power transmission path coupling the first gear and wheels of the vehicle to each other; and an actuator configured to move the rotor to a first position where the rotor is disposed on an inside of the stator in the radial direction and a second position where the rotor is closer to the first gear than the first position, wherein upon the rotor being moved to the second position by the actuator, the first gear is urged in the axial direction due to an increase in a magnetic force applied between the rotor and the permanent magnet of the first gear that repels the first gear away from the rotor to push a tooth surface of the first gear against a tooth surface of the second gear to reduce backlash between the first gear and the second gear.

\* \* \* \* \*